United States Patent

Kanbar

[11] Patent Number: 5,850,126
[45] Date of Patent: Dec. 15, 1998

[54] SCREW-IN LED LAMP

[76] Inventor: Maurice S. Kanbar, 2140 Pacific Ave., San Francisco, Calif. 94115

[21] Appl. No.: 834,566

[22] Filed: Apr. 11, 1997

[51] Int. Cl.$^6$ ................................................... H05B 43/00
[52] U.S. Cl. ..................... 315/200 A; 362/800; 340/331; 340/332
[58] Field of Search ................................ 315/200 A, 76; 362/800; 340/331, 332, 333

[56] References Cited

U.S. PATENT DOCUMENTS

| | | | |
|---|---|---|---|
| 4,211,955 | 7/1980 | Ray | 315/53 |
| 5,313,188 | 5/1994 | Choi et al. | 315/200 A |
| 5,561,346 | 10/1996 | Byrne | 313/512 |

*Primary Examiner*—Arnold Kinkead
*Attorney, Agent, or Firm*—Michael Ebert

[57] ABSTRACT

A screw-in LED lamp which derives its power from a socket connected to an A-C power line, the lamp being screwed into the socket to produce a light of high intensity useful as a traffic signal or as a warning signal. The lamp includes a screw-in plug connected to a regulator in which the A-C is converted to a D-C voltage which is applied to a bank of LEDs through a power transistor. The power transistor is activated by a pulse generator yielding periodic pulses having a repetition rate of about 20 pulses per second whereby the LEDs in the bank are pulse-activated to produce light flashes which because of visual persistence are seen as a steady light. Each pulse activating the LEDs has a duration of a few microseconds and a voltage magnitude producing a high current flow in each LED whose amplitude is a multiple of the normal current rating of the LED. As a consequence, the intensity of the light flashes is much higher than the normal light intensity, but because of the microseconds duration of the pulses, the high current flow is not damaging to the LED.

10 Claims, 2 Drawing Sheets

SCREW-IN LED LAMP

BACKGROUND OF INVENTION

1. Field of the Invention

This invention relates generally to LED lamps, and more particularly to a screw-in LED lamp producing light of high intensity useable as a traffic signal or as a warning signal.

2. Status of Prior Art

A light-emitting diode, generally identified as an LED, is a rectifying semiconductor which converts electrical energy applied thereto to light whose color depends on the material from which the diode is made. Thus when a D-C voltage is applied to a gallium arsenide LED, light having a green color is produced, whereas a gallium arsenide phosphate LED produces a red color and a silicon carbide LED yields a yellow color.

The 1996 Byrne U.S. Pat. No. 5,561,346 discloses an LED lamp of the screw in type adapted to screw into a socket supplying A-C power. The stem of the lamp houses a regulator circuit to convert the A-C power line voltage to a relatively low D-C voltage appropriate to the bank of LEDs mounted at the front end of the lamp body. The regulator circuit also acts to maintain the output D-C voltage at a level necessary for proper LED operation. The LED lamp in the Byrne patent is useable as a traffic signal in place of a screw-in incandescent lamp.

The 1995 patent to Deese et al. U.S. Pat. No. 5,457,450 points out that traffic signal lights consisting of hundreds of LEDs have been developed to replace conventional incandescent light bulbs in ordinary traffic signals. These LED lamps can be designed to have the same light intensity as the incandescent bulbs that are currently used and to have comparable performance characteristics.

The Deese et al. patent stresses the advantages to be gained in replacing incandescent light bulbs in traffic with LED lamps. The first advantage is that with an LED lamp, one can achieve a dramatic decrease in energy consumption, for an LED traffic signal light can consume as little as 15 percent as much as an incandescent light bulb producing light of the same intensity. This energy conservation can save municipalities a substantial sum of money, and also conserve available energy resources.

A second major advantage of an LED traffic signal light is its reliability. Typically, an incandescent bulb used in a traffic signal light must be replaced at least once a year, whereas an LED traffic light lamp has a useful life exceeding 10 years.

The Deese et al. patent notes that an advantage of an incandescent light bulb over an LED lamp as a traffic signal light is that the light bulb generates sufficient light to control traffic even if there is a substantial drop in the A-C level voltage applied to the bulb, as in a brown-out. In contradistinction, when there is a substantial drop in the voltage supplied to an LED lamp, this results in a sharp decrease in light intensity, and the light may then be insufficient to control traffic. To overcome this drawback, Deese et al. provide a voltage compensation circuit which allows the LED traffic light to operate over a wide range of input power voltages while generating light of sufficient intensity to control traffic.

The 1994 patent to Choi et al. U.S. Pat. No. 5,313,188 discloses a flashing safety warning light in which a super-luminescent light-emitting diode (SLD) is driven by an oscillatory drive signal at a visually imperceptible but highly efficient operating frequency. The oscillatory drive signal is preferably a pulse signal of 1 to 5 KHz to cause the SLD to be illuminated and extinguished at the oscillatory drive signal frequency, such that extinction of the SLD is not visually perceptible.

The oscillatory drive signal is in turn gated on and off in accordance with a gating signal at a low, visually-perceptible frequency in the range of 3 to 12 Hz with a pulse duty cycle of between 10 to 60% in order to cause the SLD to be visually perceived as flashing on and off at the gating signal frequency in an attention-getting manner.

SUMMARY OF INVENTION

In view of the foregoing, the main object of this invention is to provide an LED screw-in lamp which produces a colored light useful as a traffic signal or as a warning signal.

A significant feature of an LED screw-in lamp in accordance with the invention is that it produces a light of exceptionally high intensity while drawing relatively low power from the A-C power source connected to the socket in which the lamp is screwed.

More particularly, an object of this invention is to provide an LED lamp of the above type which includes a regulator to convert the A-C power line voltage to a D-C voltage and a power transistor activated by a pulse generator to apply D-C pulses to a bank of LEDs, all of which are housed in the lamp, whereby the screw-in lamp is useable as a replacement for a screw-in incandescent lamp of a given wattage, yet provides a greater light output at a lower wattage.

Also an object of this invention is to provide a screw-in LED lamp having a prolonged operating life far greater than the life of an incandescent light bulb yielding a like amount of light.

Briefly stated, these objects are attained by a screw-in LED lamp which derives its power from a socket connected to an A-C power line, the lamp being screwed into the socket to produce a light of high intensity useful as a traffic signal or as a warning signal light. The lamp includes a screw-in plug connected to a regulator in which the A-C is converted to a D-C voltage which is applied to a bank of LEDs through a power transistor.

The power transistor is activated by a pulse generator yielding periodic pulses having a repetition rate of about 20 pulses per second whereby the LEDs in the bank are pulse-activated to produce light flashes which because of visual persistence are seen as a steady light. Each pulse activating the LEDs has a duration of a few microseconds and a voltage magnitude producing a current flow in each LED whose amplitude is a multiple of the normal current rating of the LED. As a consequence the light intensity of the light flashes is much higher than the normal light intensity, but because of the microseconds duration of the pulses, the high current is not damaging to the LED.

BRIEF DESCRIPTION OF DRAWING

For a better understanding of the invention, as well as further features thereof, reference is made to the detailed description thereof to be read in connection with the annexed drawings wherein.

DETAILED DESCRIPTION OF INVENTION

Figure 1:
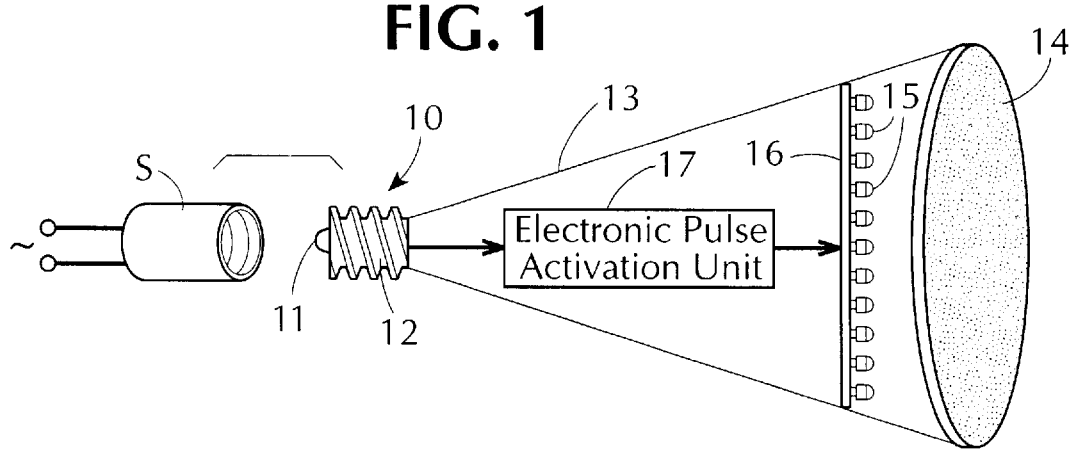
FIG. 1 illustrates schematically an LED lamp in accordance with the invention.

Referring now to FIG. 1, shown therein is an LED screw-in lamp in accordance with the invention, the lamp including a standard screw type plug 10. Plug 10 is provided with an inner terminal 11, and an externally-threaded outer terminal 12. Plug 10 is adapted to screw into a standard incandescent light bulb socket S connected to an A-C power line, such as a 110V A-C line. The screw-in lamp may therefore replace a conventional incandescent light bulb.

Figure 2:
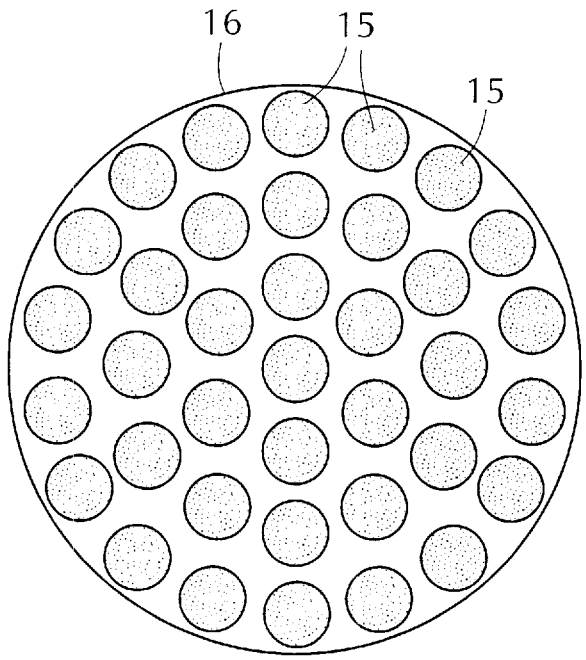
FIG. 2 shows the array of LEDs included in the LED lamp.

Extending from plug 10 is a frusto-conical casing 13 the mouth of which is covered by a diffusion lens 14. Behind the lens is an array of LEDs 15 mounted on a reflective base 16, as shown separately in FIG. 2. The light rays collectively emitted by the bank of LEDs are directed toward lens 14 which yields a uniformly dispersed light whose color depends on the material from which the light-emitting diode is made.

Activation of LEDs 15 is effected by periodic voltage pulses applied thereto by an electronic pulse activation unit 17 housed within casing 17 and operated by a the A-C voltage obtained when plug 10 is screwed in power-line socket S.

Figure 3:
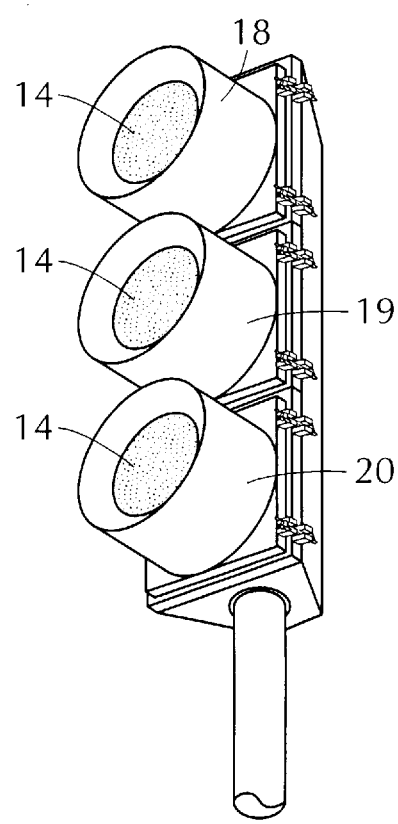
FIG. 3 shows a traffic signal light whose red, yellow and green lights are each produced by an LED lamp in accordance with the invention.

The screw-in LED lamp is useable in a conventional traffic signal as shown in FIG. 3. The traffic signal is provided with a red light assembly 18, a yellow light assembly 19, and a green light assembly 20, one below the other. The LED lamp screwed into the socket of each assembly has an array of LEDs producing the appropriate light color; Red, Yellow and Green being the standard LED colors.

Figure 4:
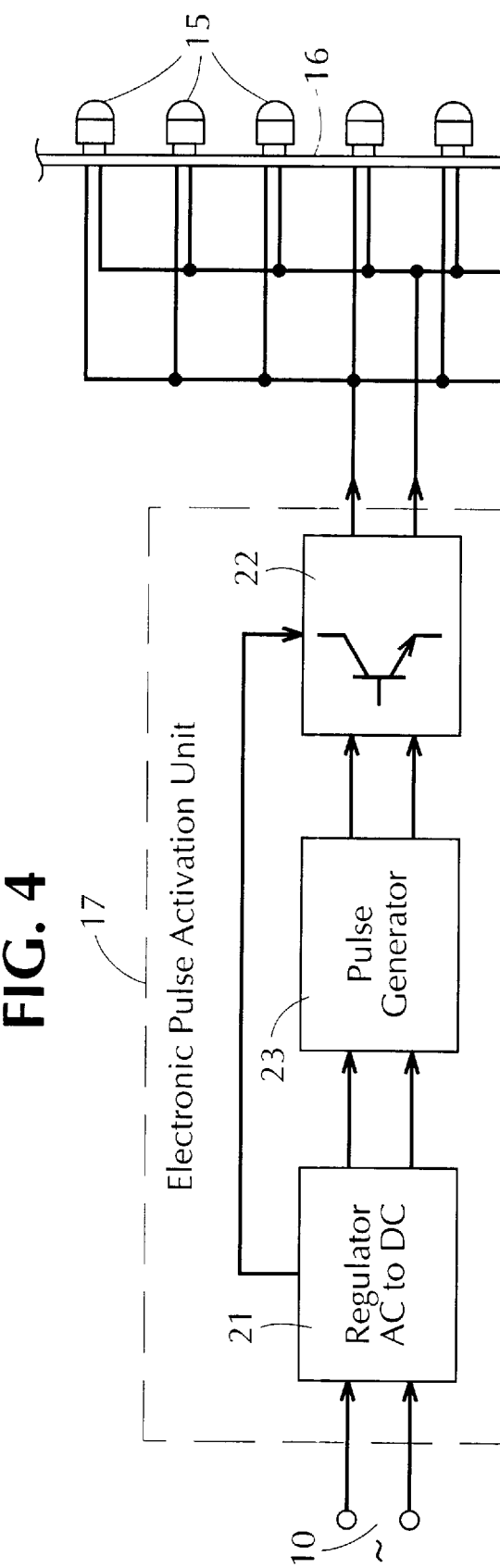
FIG. 4 is a block diagram of the array of LEDs and the stages of the LED lamp associated therewith.

As shown in FIG. 4, the LEDs 15 in the array included in the lamp which are mounted on reflective base 16 are all connected in parallel relation. Hence when a voltage pulse of a given magnitude is applied to the parallel-connected LEDs they are all excited to the same extent. In practice, instead of connecting all LEDs in parallel relation, the array of LEDs may be composed of parallel strings of LEDs, each string containing serial-connected LEDs. Thus if each LED has an operating voltage of 3 volts D-C, and the string consists of 10 LEDs in series, then the string operates at 30 volts.

Electronic pulse activator unit 17, as shown in FIG. 4 includes a voltage regulator 21 connected through plug 10 to the A-C power line (i.e. 110V A-C). Regulator 21 includes a transformer to step down the A-C voltage to an appropriate level and a rectifier which rectifies the A-C voltage to produce a D-C voltage of the desired magnitude and to maintain this voltage despite fluctuations in the A-C line voltage.

The D-C voltage yielded by regulator 21 is applied to the bank of parallel-connected LEDs 15 through a power transistor 22. Transistor 22 is activated by a pulse generator 23 operated from regulator 21. Pulse generator 23 yields periodic voltage pulses at a visual persistence repetition rate, such as 20 pulses per second.

Visual persistence is the sensation in the retina of the eye that does not cease at once when a light stimulus is removed. Thus light flashes which occur at 20 or more times a second will produce no detectable flicker, and will be seen by the eyes as steady light.

Each time power transistor 22 is activated by pulse generator 23, all LEDs 15 then receive a voltage pulse from the transistor and are caused to flash simultaneously. With a typical commercial LED, the normal rating of current flow through the transistor when a rated voltage of 3 volts D-C is applied across the LED is 100 milliamperes, and the resultant light intensity is moderate. While operating the LED at a higher voltage to produce a higher current flow therethrough will result in a greater light output, an LED cannot tolerate a higher current than its rated value if the current is uninterrupted, for this would break down the diode.

Figure 5:
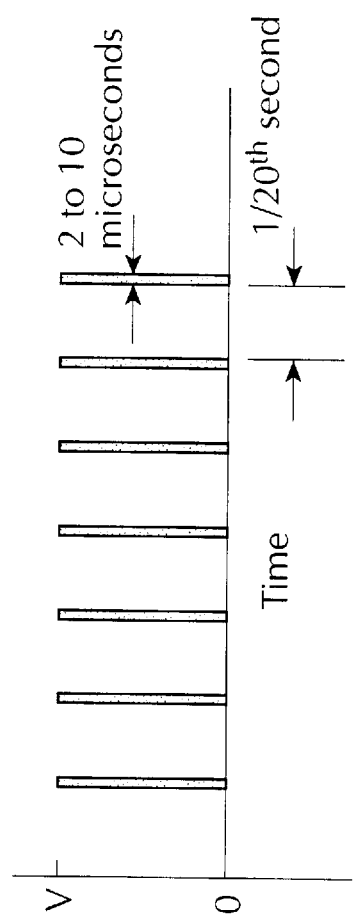
FIG. 5 illustrates graphically the periodic voltage pulses which activate the bank of LEDs.

To produce light flashes of much greater intensity than is normally yielded by the LEDs without injury to the LEDs, the voltage pulses applied to the LEDs by power transistor 22, when activated by pulse generator 23, are of an extremely short duration, say 2 to 10 microseconds, as shown in FIG. 5.

Because the current passing through the LEDs is pulsed, and the LEDs are activated for just a few microseconds and are not again turned on until ½0th of a second later when the pulse repetition rate is 20 pulses per second, it becomes possible to safely operate the LEDs with a much higher current. By reducing or eliminating current reducing resistors, instead of the rated 100 mA current flow, a one ampere or more current flow during the 2 to 10 microseconds pulse period can safely be handled by the LED. As a consequence, the light intensity from the pulsed LEDs is 10 times higher than when the LEDs operate continuously with a 100 mA current flow therethrough. Yet the amount of power consumed by the pulse-activated LED lamp is relatively small, for this power is but a fraction of the power that would be drawn by the lamp had the LED been operated continuously.

A LED lamp in accordance with the invention is by no means limited to traffic signal light applications, for it is useful wherever there is a need for a warning signal. Thus the lamp may be used as a red light signal in exit signs in theaters. And as pointed out previously, an LED lamp has a much longer operating life than an incandescent bulb producing a like light output.

While there has been shown and described a preferred embodiment of a screw-in LED lamp, it will be appreciated that many changes and modifications may be made therein without, however, departing from the essential spirit thereof.

I claim:

1. A screw-in LED lamp for producing a traffic or warning signal, said lamp comprising:

A. a bank of interconnected LED elements;

B. a plug adapted to screw into a socket connected to an A-C power line; and

C. an electronic pulse activation unit connected to the plug to convert the A-C yielded thereby to periodic D-C voltage pulses and to apply these pulses to the bank of LED elements to cause these elements to produce periodic light flashes, said pulses having a repetition rate producing visual persistence whereby the light flashes are seen as a steady light having a color determined by diode material from which the LED elements are made, said bank of LED elements all having a normal current rating based on a continuous application thereto of a voltage having a predetermined magnitude, the voltage pulses applied to the LED elements having a much greater magnitude and a pulse duration of a few microseconds, whereby the resultant current is of far greater amplitude than the normal current rating and the light flashes produced by the LED elements are of far greater intensity.

2. An LED lamp as set forth in claim 1, in which the diode material produces a red color.

3. An LED as set forth in claim 1, in which the diode material produces a yellow color.

4. An LED as set forth in claim 1, in which the diode material produces a green color.

5. An LED lamp as set forth in claim 1, in which said plug is attached to one end of a frusto-conical casing at whose other end is mounted a lens behind which is said bank of LED elements, said electronic pulse activation unit being housed within the casing.

6. An LED lamp as set forth in claim 1, in which the pulse duration is no greater than about 10 microseconds.

7. An LED lamp as set forth in claim 1, in which the resultant current has an amplitude which is about 10 times greater than the normal current rating.

8. An LED lamp as set forth in claim 1, in which the unit includes a regulator having a rectifier to convert the A-C to a D-C voltage and to maintain this voltage at a steady level despite fluctuations in the A-C.

9. An LED lamp as set forth in claim 7, in which the D-C voltage is applied to the bank of LED elements through a power transistor which is periodically activated.

10. An LED lamp as set forth in claim 9, in which the power transistor is periodically activated by pulses yielded by a pulse generator powered by said D-C voltage.

* * * * *

UNITED STATES PATENT AND TRADEMARK OFFICE
CERTIFICATE OF CORRECTION

PATENT NO. : 5,850,126  Page 1 of 1
APPLICATION NO. : 08/834566
DATED : December 15, 1998
INVENTOR(S) : Kanbar It is certified that error appears in the above-identified patent and that said Letters Patent is hereby corrected as shown below:

On Title Page (item 57)
Line 13, delete "microseconds" and insert therfor --milliseconds--;
Line 17, delete "micro- " and insert therfor --milli- --.

Fig. 5, delete "microseconds" and insert therefor --milliseconds--.

Col. 2, line 47, delete "microseconds" and insert therfor --milliseconds--;
Col. 2, line 52, delete "microseconds" and insert therfor --milliseconds--;
Col. 4, line 64, delete "microseconds" and insert therfor --milliseconds--;
Col. 5, line 14, delete "microseconds" and insert therfor --milliseconds--

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,850,126 | Page 1 of 1 |
| APPLICATION NO. | : 08/834566 | |
| DATED | : December 15, 1998 | |
| INVENTOR(S) | : Kanbar | |

It is certified that error appears in the above-identified patent and that said Letters Patent is hereby corrected as shown below:

On Title Page (item 57)
Line 13, delete "microseconds" and insert therfor --milliseconds--;
Line 17, delete "micro- " and insert therfor --milli- --.

Fig. 5, delete "microseconds" and insert therefor --milliseconds--.

Col. 2, line 47, delete "microseconds" and insert therfor --milliseconds--;
Col. 2, line 52, delete "microseconds" and insert therfor --milliseconds--;
Col. 4, line 64, delete "microseconds" and insert therfor --milliseconds--;
Col. 5, line 14, delete "microseconds" and insert therfor --milliseconds--

Signed and Sealed this

Fifth Day of September, 2006

JON W. DUDAS
*Director of the United States Patent and Trademark Office*